United States Patent [19]

Cooke et al.

[11] Patent Number: 4,873,444
[45] Date of Patent: Oct. 10, 1989

[54] DETECTION OF SURFACE IMPURITY PHASES IN HIGH $T_C$ SUPERCONDUCTORS USING THERMALLY STIMULATED LUMINESCENCE

[75] Inventors: D. Wayne Cooke, Los Alamos, N. Mex.; Muhammad S. Jahan, Bartlett, Tenn.

[73] Assignee: The United States of America as represented by the United States Department of Energy, Washington, D.C.

[21] Appl. No.: 276,188

[22] Filed: Nov. 23, 1988

[51] Int. Cl.[4] ............................................ G01N 23/00
[52] U.S. Cl. .................................. 250/337; 250/484.1
[58] Field of Search .............. 250/484.1 A, 337, 336.2

[56] References Cited

U.S. PATENT DOCUMENTS 2,573,245 10/1951 Boyd et al. ........................... 250/337
3,317,727 5/1967 Medlin ................................ 250/337

Primary Examiner—Carolyn E. Fields
Attorney, Agent, or Firm—Samuel M. Freund; Paul D. Gaetjens; Judson R. Hightower

[57] ABSTRACT

Detection of surface impurity phases in high-temperature superconducting materials. Thermally stimulated luminescence has been found to occur in insulating impurity phases which commonly exist in high-temperature superconducting materials. The present invention is sensitive to impurity phases occurring at a level of less than 1% with a probe depth of about 1 μm which is the region of interest for many superconductivity applications. Spectroscopic and spatial resolution of the emitted light from a sample permits identification and location of the impurity species. Absence of luminescence, and thus of insulating phases, can be correlated with low values of rf surface resistance.

11 Claims, 5 Drawing Sheets

DETECTION OF SURFACE IMPURITY PHASES IN HIGH $T_C$ SUPERCONDUCTORS USING THERMALLY STIMULATED LUMINESCENCE

BACKGROUND OF THE INVENTION

The present invention relates generally to thermally stimulated luminescence (TSL) and, more particularly, to the detection of insulating surface impurity phases in the presence of high-$T_c$ superconducting materials. The United States Government has rights in this invention pursuant to Contract No. W-7405-ENG-36 between the U.S. Department of Energy and the Regents of the University of California.

Superconductivity above 90K in multiphase Y-Ba-Cu-O systems has been well established. Major impediments to the technological application of such high-$T_c$ superconductors are their low transport critical current density ($J_c$) and relatively high radio frequency (rf) surface resistance ($R_s$). A possible source of this problem is the presence of insulating impurity phases at the surface or at grain boundaries of the superconductor. Microstructure and composition of grain boundaries and their effect on the superconducting properties of high-$T_c$ materials has been investigated with the general result being that $J_c$ can be increased by increasing the grain size, thereby reducing the number of grain boundaries. Similarly, it has been observed that by removing second phases (insulating grain boundary material), which produce rf losses, $R_s$ decreases. Therefore, it would be of great benefit to the art of superconducting material manufacture to have a rapid, sensitive, and inexpensive procedure for detecting insulating phases in high-$T_c$ superconductors. It would further be advantageous to be able to identify the deleterious phases, in order that sample preparation techniques could be modified to eliminate the unwanted impurities.

Several papers report the observation of thermally stimulated luminescence from superconducting materials: 1. D. W. Cooke et al., "Thermally Stimulated Luminescence from Rare-Earth-Doped Barium Copper Oxides," Phys. Rev. B 36. 2287 (1987); 2. D. W. Cooke et al., "Luminescent Properties of X-Irradiated Rare-Earth-Doped Barium Copper Oxides," J. Mater. Res. 2,871 (1987); 3. Yasufumi Fujiwara et al., "Characterization Of High $T_c$ Superconductor by Luminescence Methods," to be published (1988); and 4. Yasufumi Fujiwara et al., "Thermally Simulated Luminescence from High-$T_c$ Superconducting Tl-Ba-Ca-Cu-O System," Japan. J. Appl. Phys. 27, L1706 (1988). However, none of these papers recognized that the thermally stimulated luminescence derived from impurities present in the superconducting sample. All believed that it was the superconducting material itself which was responsible for the luminescence. Interestingly, reference reported that a 99% pure sample of $GdBa_2Cu_3O_x$ did not exhibit luminescence. The authors proffered that TSL in superconducting samples is due to the surface properties rather than any particular phase which accounts for the sample-to-sample variation in observations.

In V. N. Andreev et al., "Cathodoluminescence In A High-Temperature Superconductor Y-Ba-Cu-O," JETP Lett. 46. 492 (1987), the authors report the luminescence generated as a result of an electron beam impacting a sample of superconducting material. Although it is reported that certain features of the emission spectrum match those of free yttrium oxide, and that x-ray diffraction investigation of the sample reveals the presence of this material, the authors conclude that the emission is from the superconducting material.

Accordingly, it is an object of the present invention to provide a method for detecting insulating phases in high-$T_c$ superconducting materials.

Another object of our invention is to identify insulating phases in high-$T_c$ superconducting materials.

Yet another object of the present invention is to locate insulating phases in high-$T_c$ superconducting materials.

Still another object of our invention is to determine the surface resistance of high-$T_c$ superconducting materials.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the present invention, as embodied and broadly described herein, the method for detecting insulating phases in samples of superconducting materials hereof includes the steps of irradiating the sample with ionizing radiation in order to induce charge-trapping in the insulating phases, heating the irradiated sample to yield luminescence, and detecting the luminescence as a function of sample temperature. Preferably, the luminescence is spectroscopically resolved in order to enable the identification of the insulating material. It is also preferred that the luminescence be spatially resolved in order to enable the identified insulating material to be located relative to the superconducting material. One or more light pipes might be utilized for this purpose. Preferably also, the ionizing radiation includes $\gamma$-, x-, or $\beta$- radiation. In a further aspect of the present invention, in accordance with its objects and purposes, the method of determining the surface resistance of a superconducting material includes the steps of irradiating the sample with ionizing radiation in order to induce charge trapping in the insulating phases thereof, heating the irradiated sample to yield luminescence, and detecting the integrated luminescence as a function of sample temperature. The surface resistance is proportionally related to the integrated luminescence, and an unknown sample can be evaluated by comparison with a curve for which integrated luminescence and resistivity are measured for similar samples.

Benefits and advantages of our invention include the sensitive, rapid, and inexpensive detection, location, and identification of insulating phases in high-temperature superconducting materials with the consequent possibility of modifying preparation techniques to eliminate such unwanted phases. Moreover, the surface resistance of the material can be measured without resorting to the more complex and time-consuming microwave cavity techniques.

BRIEF DESCRIPTION OF THE DRAWINGS

The accompanying drawings, which are incorporated in and form a part of the specification, illustrate the embodiment of the present invention and, together with the description, serve to explain the principles of the invention. In the drawings.

DETAILED DESCRIPTION OF THE PREFERRED EMBODIMENT OF THE INVENTION

Figure 1:
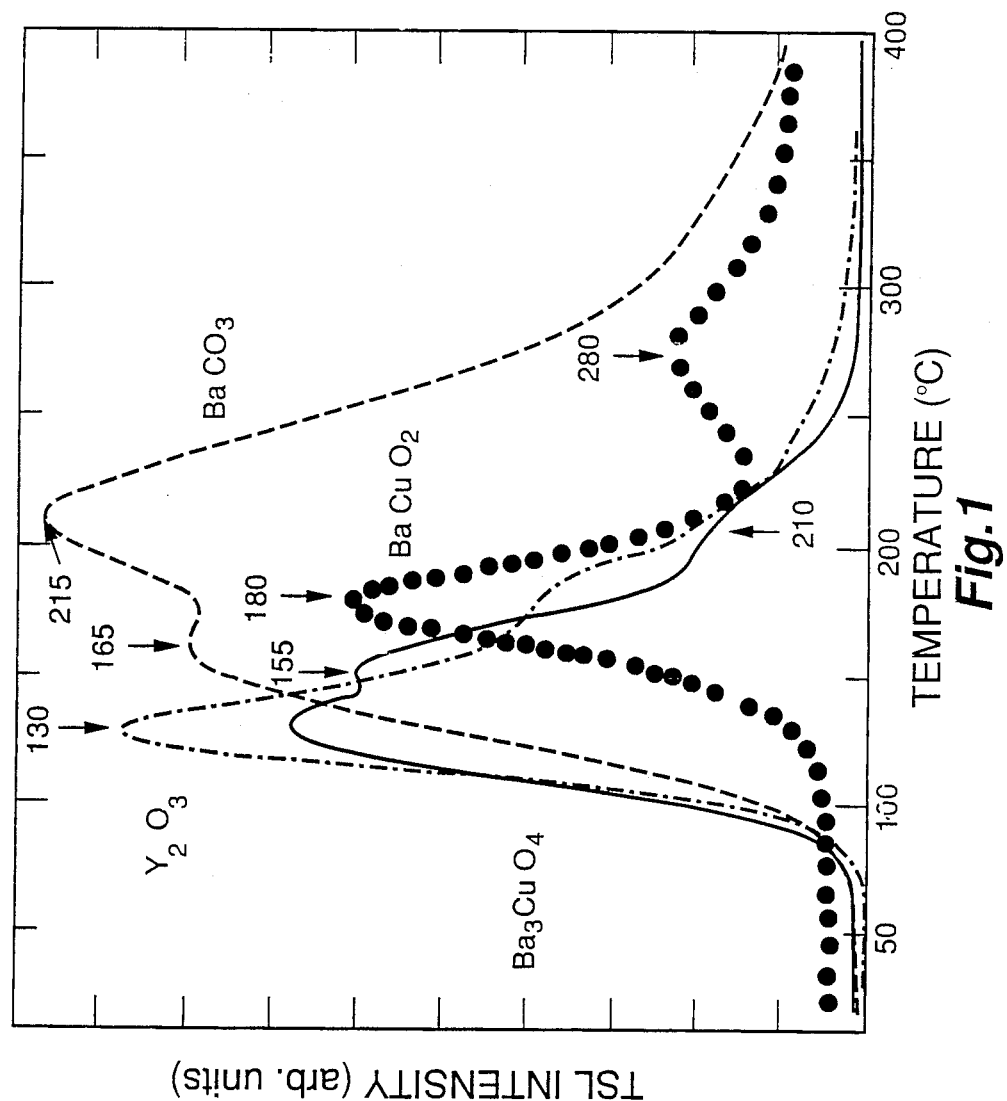
FIG. 1 shows thermally stimulated luminescence emission from samples of $Y_2O_3$, $Ba_3CuO_4$, $BaCuO_2$, and $BaCO_3$.

Investigation of the thermally stimulated luminescence from a sample of superconducting material is a rapid, sensitive, and inexpensive technique for determining the presence of insulating, impurity phases therein. The estimated probe depth of this procedure is about 1 μm, thereby rendering it valuable for examining superconductors having applications deriving from surface properties. In its simplest form, an apparatus for measuring thermally stimulated luminescence includes a sample holder, a heater with thermocouple output, and a photomultiplier tube all mounted in a light-tight enclosure. Current from the photomultiplier is amplified and recorded as a function of sample temperature with the resulting curve being referred to as a thermally stimulated luminescence glow curve. Exposure of the samples to ionizing radiation induces charge trapping. The resulting metastable electron-hole pairs in insulating substances recombine upon heating to yield luminescence. No radiation effect is expected to occur in the superconducting materials since the exposure is small.

It would be obvious to an artisan having ordinary skill in the field of thermally stimulated luminescence, after reading the subject disclosure, that in order to locate the source of the luminescence, that is, the insulating material, a single light pipe, or a series of light pipes could be employed to gather light from specific portions of the sample during the heating process. If a single light pipe is used, a mechanical table would be provided to sweep the surface of the sample under one end of the pipe so that the luminescence of the surface as a function of both temperature and location could be generated. In either situation where light pipes are employed, each having a detector associated therewith, or where a single detector views all of the emitted luminescence, a spectrophotometer, or several spectrophotometers might be employed to resolve the specific emitted wavelengths in order to identify the composition of the insulating material source.

Samples for investigation according to the method of the present invention were exposed to $1.53 \times 10^5$ R of $^{60}Co$ radiation at room temperature. It would also be obvious to one of ordinary skill in the art of thermally stimulated luminescence, after reading the present disclosure, that x-rays or high-energy electrons could be employed as ionizing radiation in the same manner as have gamma rays according to the teachings of the subject invention. Following exposure to gamma radiation, the samples were heated to approximately 400° C. in a commercial luminescence reader at a constant rate of about 4.4° C. sec$^{-1}$ and the thermally stimulated luminescence signal recorded. The area under the recorded luminescence plotted as a function of temperature is proportional to the total light emitted by the sample, which in turn, is proportional to the amount of insulating material present in the sample under investigation.

The presence of insulating surface impurity phases in high-$T_c$ superconducting materials is deleterious to rf surface resistance. Normal conducting electrons of the insulating materials dominate the rf losses, thereby making $R_s$ higher than expected if only superconducting electrons were present. TSL represents a measure of the presence of these normal-state electrons and is therefore an indirect measure of $R_s$. If the integrated thermally stimulated luminescence is determined for a series of superconducting samples having similar compositions and the results normalized for mass and surface area of the emitting material involved, and the surface resistance is measured, a simple relationship is found to exist for these two quantities. Superconducting samples with unknown resistivity may be evaluated by comparing their TSL with the known samples according to the relationship.

Figure 2:
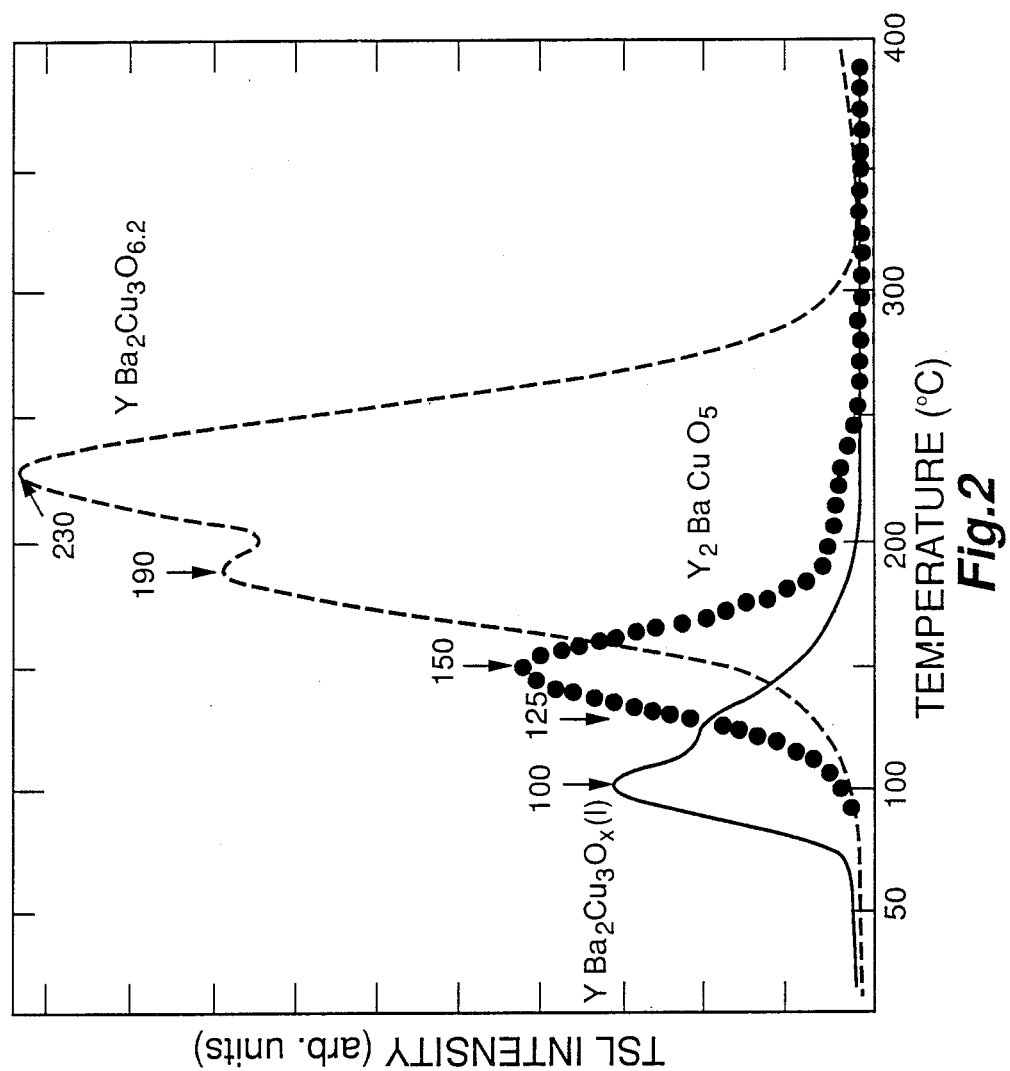
FIG. 2 shows thermally stimulated luminescence emission from samples of $Y_2BaCuO_5$, $YBa_2Cu_3O_{6.2}$, and $YBa_2Cu_3O_x(I)$.
Figure 3:
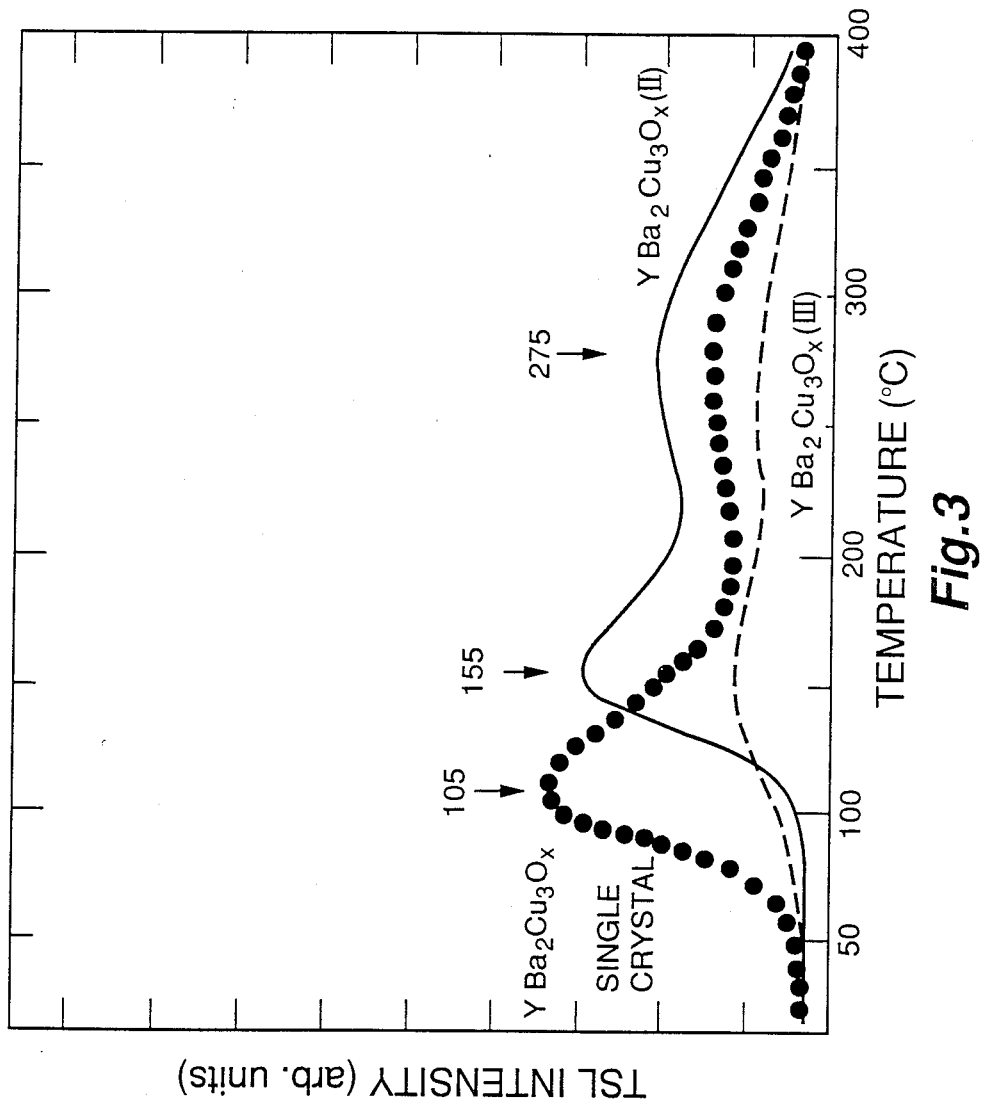
FIG. 3 shows thermally stimulated luminescence emission from single-crystal $YBa_2Cu_3O_x$, and two sintered samples of $YBa_2Cu_3O_x$.

Reference will now be made in detail to the present preferred embodiments of the invention, examples of which are illustrated in the accompanying drawings. FIGS. 1, 2, and 3 hereof, show the resulting thermally stimulated luminescence emission for samples of $Y_2O_3$, $Ba_3CuO_4$, $BaCuO_2$, $BaCO_3$, $Y_2BaCuO_5$, $YBa_2Cu_3O_{6.2}$, and various forms of $YBa_2Cu_3O_x$. FIG. 3 shows the results for two high-quality sintered superconducting samples having x approximately equal to 6.9, and a superconducting crystal. All curves were recorded by heating the samples at 4.4 C/sec, and all have arbitrary ordinates. Absolute intensities are shown by the bar charts in FIG. 4 hereof. The intensities were determined by normalizing the area under each curve to the mass and to the surface area of the sample. Since all of the samples investigated are opaque, the absorption coefficient for the emitted light is large, which implies that the TSL signals emanate from within v m of the surface. Therefore, the values are normalized relative to the surface area as well as to the mass of the sample under investigation.

The insulating phases, $Y_2O_3$, $Ba_3CuO_4$, $BaCuO_2$, $BaCuO_2$, $BaCO_3$, and $Y_2BaCuO_5$, all exhibit characteristic TSL glow curves with well-defined maxima. In addition, strong luminescence is observed from a sample which has been intentionally depleted of a large fraction of the oxygen content (see, e.g., the curve labeled $YBa_2Cu_3O_{6.2}$ in FIG. 2). This sample was prepared from $YBa_2Cu_3O_x(III)$ shown in FIG. 3, which is characterized by very weak TSL. This result demonstrates that not only can TSL detect the impurity phases present, but that it can also detect the nonsuperconducting tetragonal phase, which results from the poor oxygenation of $YBa_2Cu_3O_x$. No TSL can be observed from the superconducting orthorhombic phase having $X \geqq 6.5$; as for all metals, there is no band gap of sufficient magnitude to trap the radiation-induced charges. Thus, no pure superconductor will exhibit TSL, and any observed signal must come from the insulating surface impurities. This result is especially important since high-temperature superconducting materials are formed by sintering, and consequently, are susceptible to inclusion of secondary phases.

Many applications of high-$T_c$ superconducting materials will depend on surface properties. To date, measured values of $R_s$ at 4 K for sintered pellets of high-$T_c$ superconductors are considerably higher than that for Nb at the same temperature. It may be that the relatively high values of $R_s$ for bulk materials are, in part, associated with insulating surface impurity phases present in the material.

The TSL glow curves for three superconducting materials are shown in FIGS. 2 and 3. $YBa_2Cu_3O_x(I)$ is a low-quality superconductor as evidenced by its measured low diamagnetic shielding value of 38% of $-\frac{1}{4}\pi$ and by the indication of second phase constituents from x-ray diffraction measurements. Accordingly, it is characterized by strong luminescence and a high value of $R_s$ of 9.7 m$\Omega$ as measured in a 3-GHz Nb cavity operating in the fundamental mode $TM_{010}$ at 4 K. Typical values or $R_s$ for high-$T_c$ materials at this frequency and temperature are 0.4–0.7 m$\Omega$. By contrast, $YBa_2Cu_3O_x(II)$ and $YBa_2Cu_3O_x(III)$ are both high-quality samples exhibiting 100% diamagnetic shielding. As shown in FIG. 3, they exhibit weak luminescence--two orders of magnitude less than $YBa_2Cu_3O_x(I)$. See also FIG. 4 hereof. Their corresponding values of $R_s$ are 0.1–0.2 These results indicate that insulating surface impurities contribute to high values of $R_s$, and that these values correlate with TSL emission.

Figure 4:
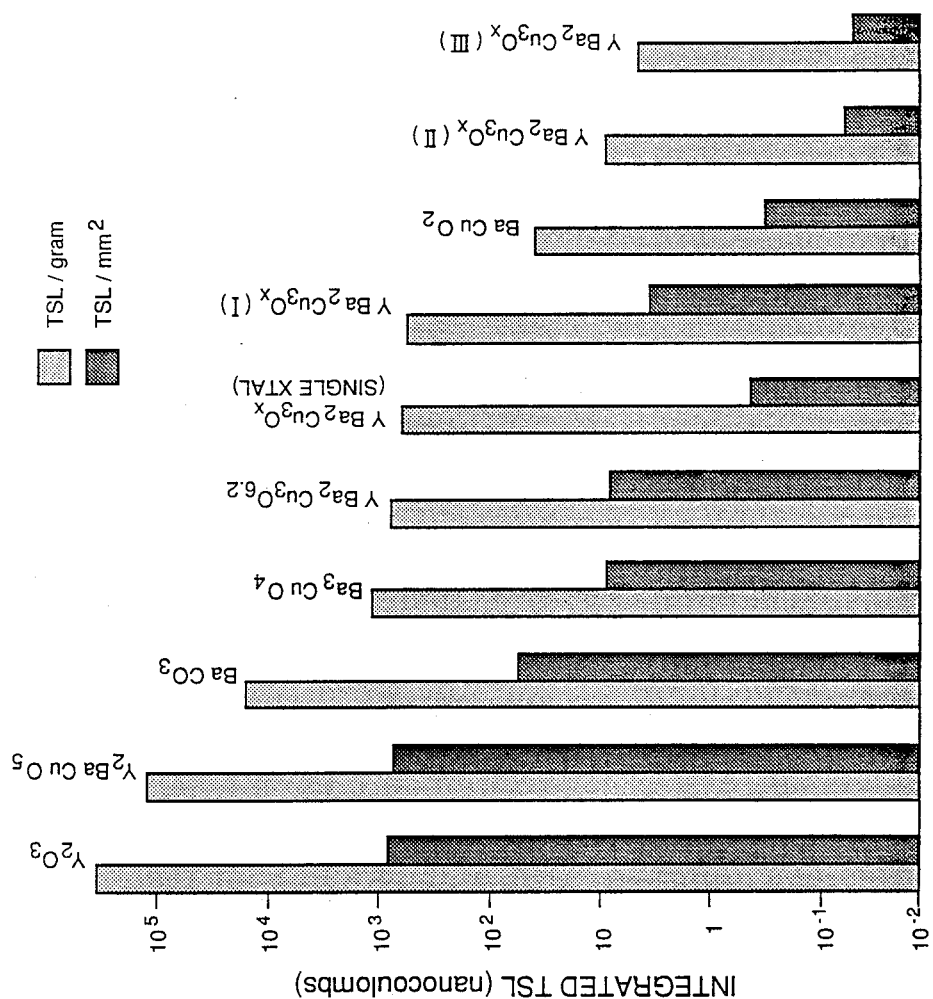
FIG. 4 shows absolute thermally stimulated luminescence emission intensities from the samples with thermally stimulated luminescence emission described in FIGS. 1-3 hereof.

FIG. 3 shows the TSL glow curves of several small (about 4 mm$^3$) $YBa_2Cu_3O_x$ single crystals. The absolute TSL intensity of these crystals is equivalent to that found in $Ba_3CuO_4$ as is shown in FIG. 4. Two factors contribute to the observed emission: 1. insulating flux left on the surface; and 2. poor oxygenation.

The composite glow curves of the superconducting samples are broad, making it difficult to correlate the insulating constituents with any particular impurity phase. Computer construction of the composite curve from individual constituent curves may be possible and may permit identification of the principal insulating phases and the fractional composition thereof. An improved identification scheme will be to allow a portion of the emitted light to pass through a monochromator, whereby its spectral content is determined. The resulting emission spectrum will be an excellent signature of the individual insulating impurities.

Figure 5:
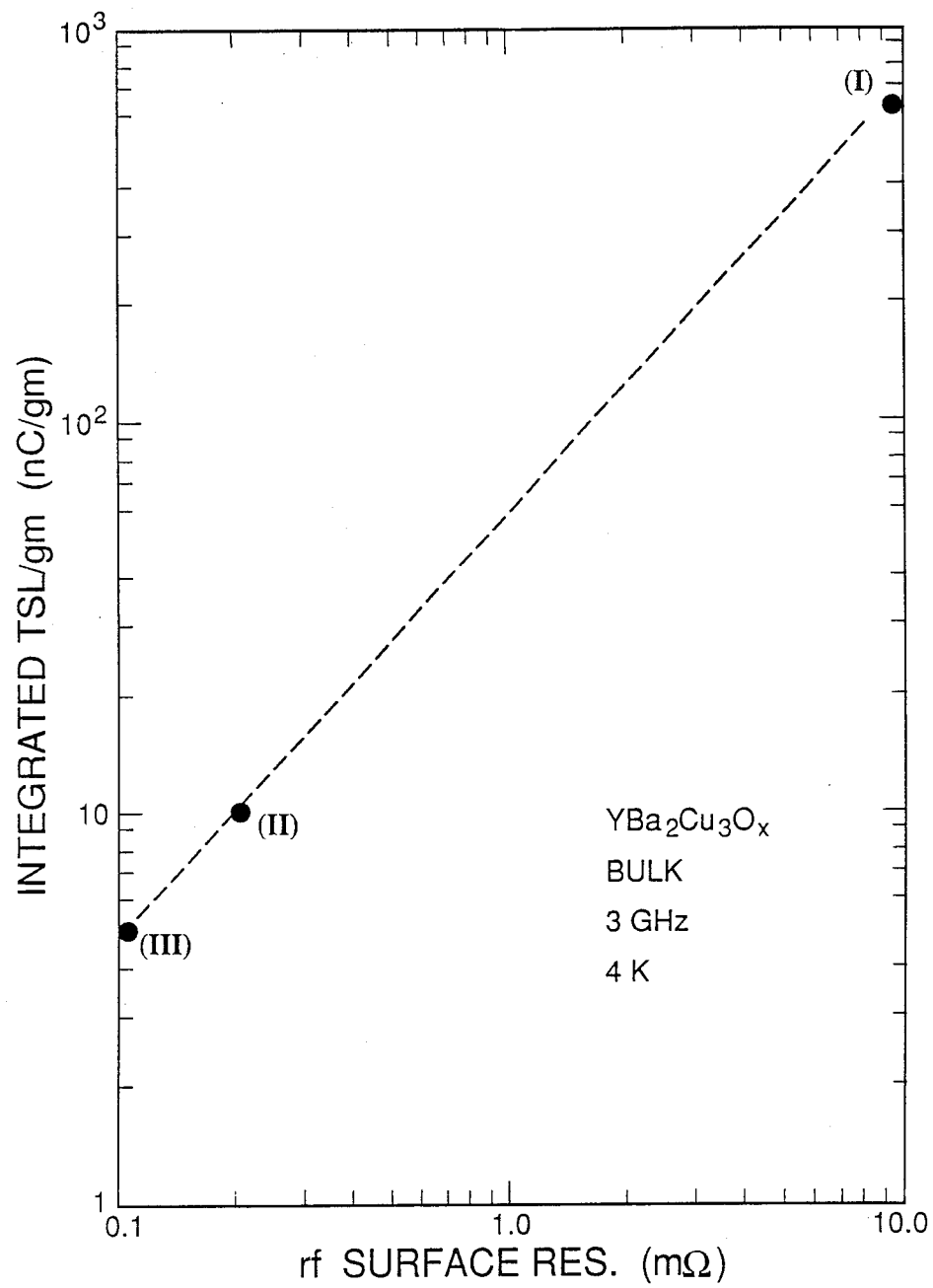
FIG. 5 shows the relationship of measured integrated thermally stimulated luminescence and measured surface resistance for several samples.

FIG. 5 shows the relationship between the integrated TSL of three superconducting samples prepared as described hereinabove with the rf surface resistance thereof. Surface resistance is measured in a microwave cavity as described above at 3 GHz and 4 K. By observing the integrated TSL of an unknown sample, one may evaluate its surface resistance by utilizing the relationship defined in FIG. 5. This indirect surface resistance measurement represents significant savings in time and a reduction in complexity when compared to direct rf cavity techniques.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. A method for detecting insulating phases in samples of superconducting materials which comprises the steps of:
    irradiating the sample with ionizing radiation in order to induce charge trapping in the insulating phases;
    heating the irradiated sample to yield luminescence; and
    detecting the luminescence as a function of sample temperature.

2. The method as described in claim 1, further comprising the step of spectroscopically resolving the luminescence during said irradiated sample heating step before said step of luminescence detecting.

3. The method as described in claim 1, further comprising the step of spatially resolving the luminescence during said irradiated sample heating step before said step of luminescence detecting.

4. The method as described in claim 2, further comprising the step of spatially resolving the luminescence during said irradiated sample heating step before said step of spectroscopically resolving the luminescence.

5. The method as described in claim 1, wherein said step of irradiating the sample with ionizing radiation comprises irradiating the sample with gamma radiation.

6. The method as described in claim 1, wherein said step of irradiating the sample with ionizing radiation comprises irradiating the sample with high-energy electrons.

7. A method for locating insulating phases in samples of superconducting materials which comprises the steps of:
    irradiating the sample with ionizing radiation in order to induce charge trapping in the insulating phases;
    heating the irradiated sample to yield luminescence;
    scanning the surface of the sample with at least one optical fiber during said heating step; and
    detecting the luminescence transmitted by the at least one optical fiber as a function of sample temperature and optical fiber position on the sample surface.

8. The method as described in claim 7, further comprising the step of spectroscopically resolving the luminescence transmitted by the at least one optical fiber during said surface scanning step before said step of luminescence detecting.

9. The method as described in claim 7, wherein said step of irradiating the sample with ionizing radiation comprises irradiating the sample with gamma radiation.

10. The method as described in claim 7, wherein said step of irradiating the sample with ionizing radiation comprises irradiating the sample with high-energy electrons.

11. A method for measuring the surface resistance of superconducting materials which comprises in combination:
    irradiating a sample with ionizing radiation in order to induce charge trapping in the insulating phases;
    heating the irradiated sample to yield luminescence;

measuring the integrated luminescence emitted by the sample as a function of sample temperature; and
comparing the integrated luminescence with a calibration curve obtained for similar samples of superconducting materials for which the integrated luminescence of each calibration sample is normalized for the mass of the sample and the surface area emitting the luminescence and related to the surface resistance thereof.

* * * * *